Aug. 12, 1958 A. N. PERRY 2,846,959
SHOCK ABSORBER FOR CARLOADINGS
Filed Jan. 23, 1956
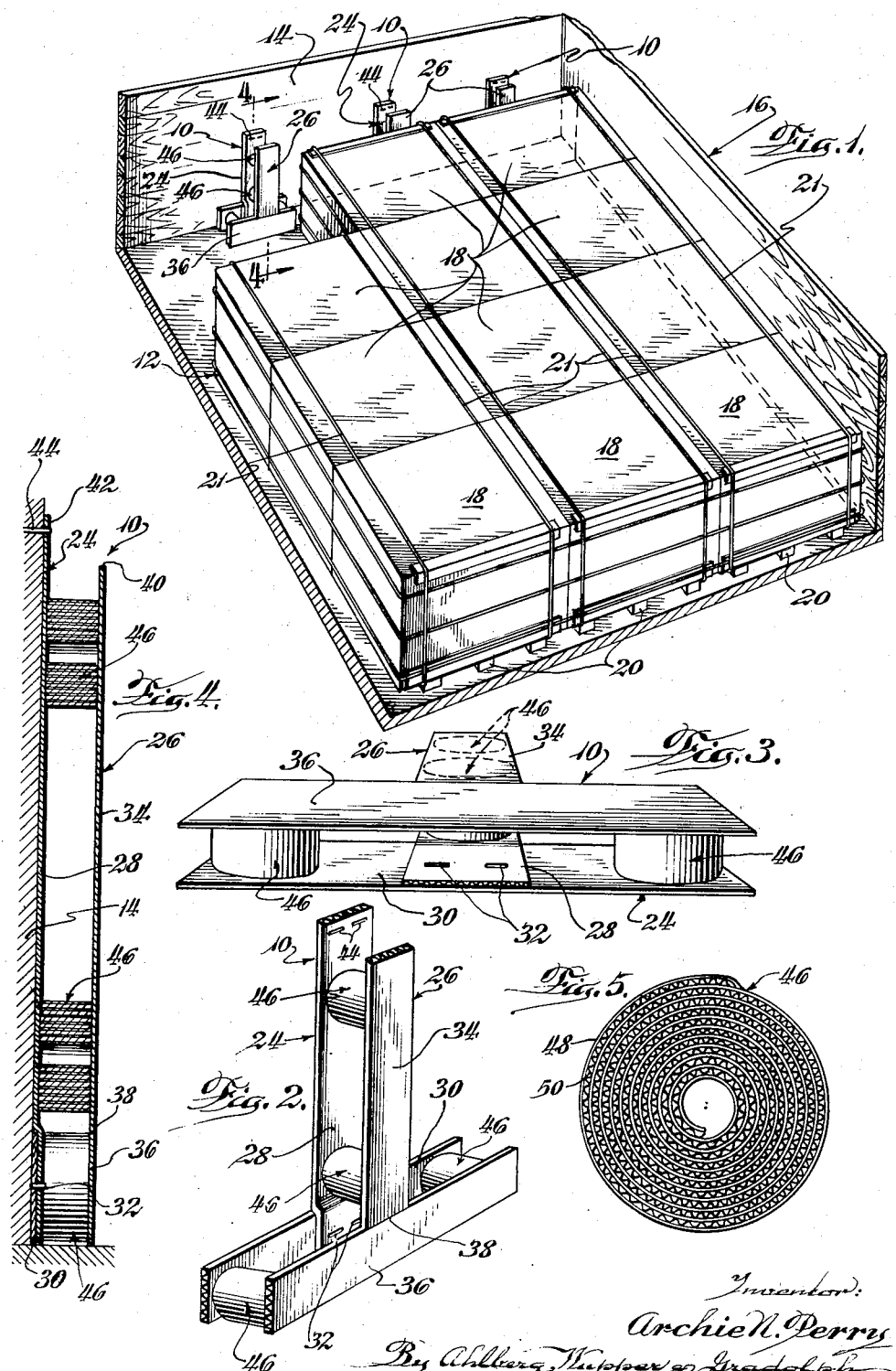

United States Patent Office 2,846,959
Patented Aug. 12, 1958

2,846,959
SHOCK ABSORBER FOR CARLOADINGS

Archie N. Perry, Wilmette, Ill., assignor to Signode Steel Strapping Company, Chicago, Ill., a corporation of Delaware Application January 23, 1956, Serial No. 560,752

1 Claim. (Cl. 105—374)

The present invention relates to improvements in carloading and in particular to a nopel disposable and inexpensive shock absorbing device which may be interposed between the wall of a load carrying vehicle and the load carried therein.

A primary problem which receives constant attention from shippers, packers, and those engaged in transport is the prevention or reduction of damage to the goods being transported. Where the goods are of the solid, boxed or packaged type, in order to reduce the damage, a number of crates, loaded pallets, or packages may be bound together with encircling ties of tensioned strapping which may also be fastened to the vehicle by suitable well known means including snubber plates. Transverse gates are also used to contain the load in one end of the vehicle. These devices, however, cannot and do not prevent some shifting of the load within the vehicle during abrupt starting and stopping of the vehicle, as occurs, for example during the shunting or switching of a freight car as a freight train is being made up or broken down in the freight yards. When the freight car comes to an abrupt halt, as it is coupled to a standing car or a string of carrs, or as it is shunted against a bumping post, the load can and frequently does slide against the car end with consequent damage to the load within the vehicle. Such damage includes bent or broken parts or articles, torn packages and the like which makes the merchandise either permanently nonusable or of reduced value in the market place. This same damage occurs when the load is in the freight car to which a moving car is coupled. In short, the biggest cause of damage to or destruction of the lading is the direct result of severe impacts at the freight car end when coupling at excessive speeds or when shunting the car into a siding where the car must be stopped by a pumping post or some other fixed stopping means at the end of the siding.

The novel device of this invention is adapted for interposition between the end wall of the freight car or other carrier and the load to absorb the shock and to prevent or minimize the damage thereto.

It is, therefore, a principal object of the present invention to provide a new and improved shock absorbing device for carloadings which may be positioned in the car between the load and the car wall.

Another object is to provide a new and improved shock absorber which is inexpensive to manufacture and which will not increase the cost of the carloading to an extent which would make its use prohibitive.

Another object is to provide a new and improved shock absorber for carloadings which may be easily fastened to and removed from the wall of the freight carrying vehicle such as a freight car against which the load might normally be expected to shift.

Still another object is to provide a new and improved shock absorber for carloadings which is made of fiberboard or paperboard so as to make it inexpensive and consequently disposable.

Still another object is to provide a new and improved shock absorber made of corrugated fiberboard or paperboard wherein the corrugations of the shock absorbing portions thereof are arranged parallel, in general, to the direction if impact so as to provide the greatest strength in resisting the load applied thereagainst.

A further object is to provide a new and improved shock absorbing device which will occupy a minimum space at the end of the vehicle or freight car against which the load may shift so as to provide maximum protection with substantially no sacrifice of payload space.

Other objects and advantages will become apparent from the following description taken in conjunction with the accompanying drawings, wherein:

Fig. 1 is a fragmentary perspective view of the interior of a freight car and a carloading with parts broken away showing the new and improved shock absorbing device of the present invention interposed between the end wall of the freight car and the load carried therein;

Fig. 2 is a perspective view of the shock absorbing device of the present invention with the device shown generally in upright position;

Fig. 3 is a perspective view of the shock absorbing device taken from the bottom thereof;

Fig. 4 is an enlarged cross sectional view of the shock absorbing device and may be considered as being taken substantially along the line 4—4 of Fig. 1 looking in the direction of the arrows; and Fig. 5 is an axial end view of one of the posts of the shock absorbing device showing a typical construction.

Referring to the drawings, the reference character 10 indicates the novel shock absorbing device of the present invention which is interposed between a load 12 and a bulkhead or an end wall 14 of a freight carrying vehicle 16 such as a freight car, although the expression "freight car" as used herein is intended to be typical rather than limitative. The load, which is a typical load, is composed of a plurality of units 18 which may be palletized as indicated at 20 and secured together by encircling ties or bands of strapping 21 which may additionally be secured to the floor of the car by snubber plates to control and minimize the shifting of the load within the vehicle 16. In addition transverse end gates adjacent the door of the vehicle may be used. (Such end gates are not shown in order to present a clear and understandable picture of the invention.)

The shock absorbing device 10 preferably includes a first member 24 and a second member 26 spaced therefrom and arranged generally parallel thereto. In the particular embodiment of the invention which is shown the members 24 and 26 have inverted T shapes although the particular shape is not intended to be limitative but only illustrative.

The member 24 is composed of a generally vertically extending stem part 28 and a horizontal or crossbar part 30, both of these parts being comprised of fiberboard or paperboard preferably of the corrugated type with the corrugations thereof extending longitudinally of each of the members although they may be made of plywood, chipboard or other similar board material. It will be seen, particularly from Fig. 4, that the stem 28 overlaps the cross bar 30 and is secured thereto by a plurality of fastening means such as staples 32.

The member 26 is comprised of a generally vertically extending stem part 34 and a horizontally extending crossbar 36. These members abut at 38 but may if preferred overlap and be secured together in the same manner as the parts 28 and 30 by suitable fastening means such as the staples 32.

It will be noted that the stem 28 of the member 24 projects a substantial distance above the upper edge 40 of the member 26 to provide a portion 42 which may be secured to the end wall 14 of the load-carrying vehicle by suitable fastening means such as staples, nails, or the like 44. It is advisable that the portion 42 extend an appreciable distance above the top edge 40 in order to allow the installer to drive the fasteners 44 through the portion 42 thereby to hang the shock absorbing device 10 from the end wall of the carrier.

Should the end wall of the carrier be made of a nonporous or noncellular material such as steel, into which a fastening device may not be driven, then the end wall may be provided with suitable hanging devices and the portion 42 apertured in order to hang the shock absorbing devices 10 from that wall.

The members 24 and 26 are spaced apart by and secured to a plurality of posts 46. Each post 46 is formed of a plurality of layers of corrugated fiberboard or paperboard which are held together preferably by an adhesive such as sodium silicate. However, these layers of corrugated fiberboard or paperboard may be secured together by any suitable means including encircling ties or bands of metallic wire or strapping.

In the particular embodiment shown in Fig. 5 the corrugated board is shown as comprised of a spiral layer of cardboard 48 interleaved with a spiral layer of corrugated fiberboard or paperboard 50 so as to provide alternate layers of uncorrugated and corrugated board which are secured together and restrained against relative radial movement by the restraining means such as the sodium silicate adhesive or the encircling bands of wire or strapping.

The ends of the posts 46 are secured to the adjacent faces of the members 24 and 26 by a suitable adhesive such as sodium silicate, although any other permanent adhesive may be used.

While there has been shown in the drawings and described hereinabove posts of generally cylindrical form comprised of spirally wound layers of uncorrugated and corrugated board, it will be obvious that these posts may be constructed of a plurality of nesting cylindrical tubes of corrugated and uncorrugated board or the outer configuration of the post may be triangular, rectangular, square, or of other suitable geometrical shape. Furthermore, the post may be constructed of laminations of corrugated and uncorrugated boards.

It is essential, however, in all of these posts regardless of the shape that the corrugations extend normally or perpendicular to the inner faces of the members 24 and 26. The inherent quality of a column or post strength of this class of material in the direction of the corrugations has been found through extensive tests to have very definite usefulness in the elimination of transmission of shock to the carloading 12 by absorption of that shock as the carloading shifts against the shock absorbers 10. Therefore, as seen best in Fig. 1, the shock absorbers 10 are placed in such manner that the lines of force of impact of the load thereagainst are parallel to the corrugations of the fiberboard material of the posts 46.

Depending upon the size, weight, potential momentum and other characteristics of the carloading, different sizes of devices will be available for installation in the ends of the vehicle. One such shock absorber 10 has an overall height of approximately 28 inches from the lower edge of the T member to the upper edge of the stem 28, with a width across the bottom thereof of approximately 24 inches. A typical post 46 has a diameter of four inches and is approximately 2½" in height. The posts 46 in the crossbar are usually set at about 20" on centers, while the posts in the stem are usually set at about 17" on centers. These dimensions are illustrative only of one size shock absorber.

If a post configuration other than cylindrical is used, it is desirable that the same amount of corrugated board be used in the post which is triangular, rectangular or other shape in order that the area of post exposed to the load be approximately the same as in the circular configuration because the resistance to the loading on the shock absorbers is determined by the amount of corrugated board in the post 46 and not particularly by the shape thereof.

While the shock absorber 10 is shown as having two face members 24 and 26, it is possible to use only one member so long as the posts 46 are mounted with the corrugations perpendicular to the face of the members.

In use it is determined first how many of the shock absorbing devices 10 are required, and their spacing across the wall 14 of the vehicle. They are put into position either by securing them to the end wall by the fastening devices 44 or by hanging them from existing hooks. Or they may be secured directly to the lading or supported from the car floor. The load 12 is then placed in the car and brought to bear firmly against the shock absorbing devices 10 and contained therein by the gate, snubber plates or other similar devices and encircling strappings 21 as required for the particular load. Other than the shock absorbing devices 10 the arrangement of the load within the car will be dictated generally by considerations which now dictate the proper arrangement of the load and the devices which are used to secure it in place and against longitudinal shifting in the car. When the car is subjected to an abrupt start or halt during switching against a standing car or otherwise, the load may shift slightly against the shock absorbing devices and the posts 46, being highly resistant to compression, will take up the movement of the load, prevent it from sliding sharply against the end wall of the car, and prevent damage to it.

It will be obvious from the foregoing description that the objects claimed for this invention are fully attained thereby.

While a single embodiment of the shock absorber constituting this invention has been shown and described, it will be apparent that modifications and variations thereof may be made without departing from the underlying principles of the invention. It is, therefore, desired by the following claim to include within the scope of the invention all such variations and modifications by which substantially the results of this invention may be obtained through the use of substantially the same or equivalent means.

What is claimed as new and desired to be secured by United States Letters Patent is:

A shock absorber for interposition between a wall of a load-carrying vehicle and the load carried therein, comprising, in combination, a first inverted T-shaped member comprised of at least one layer of corrugated fiberboard adapted for attachment to a wall of a load-carrying vehicle in face to face contact therewith, a second member of substantially the same shape as said first member and comprised of at least one layer of corrupgated fiberboard, said first and second members being arranged in parallel relationship to each other, and a plurality of generally cylindrical posts extending between said members and secured to the adjacent faces of the stems and crossbars of each of them, each of said posts comprising a plurality of juxtaposed substantially concentric layers of corrugated fiberboard with the layers thereof secured together and the corrugations thereof extending generally perpendicular to said first and second members, the free end portion of the stem of said first member extending appreciably beyond the free end of the stem of said second member and the adjacent end post between the stems of said members, whereby said shock absorber may be secured to the vehicle wall by fasteners extending through said stem end portion and into the vehicle wall with the load abutting the outer face of said second member and said posts resisting and absorbing movement of the load toward the wall to prevent the load from sliding thereagainst and being damaged as the result of such sliding movement.

References Cited in the file of this patent

UNITED STATES PATENTS 2,738,153  Frase _____ Mar. 13, 1956